United States Patent
Jyozaki et al.

(10) Patent No.: US 11,708,787 B2
(45) Date of Patent: Jul. 25, 2023

(54) UTILITY VEHICLE

(71) Applicant: KAWASAKI MOTORS, LTD, Hyogo (JP)

(72) Inventors: Takahiro Jyozaki, Akashi (JP); Takahiro Ono, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 17/534,938

(22) Filed: Nov. 24, 2021

(65) Prior Publication Data
US 2023/0160335 A1 May 25, 2023

(51) Int. Cl.
| | |
|---|---|
| *F02B 33/40* | (2006.01) |
| *F02B 33/44* | (2006.01) |
| *F02B 39/04* | (2006.01) |
| *B60K 5/00* | (2006.01) |
| *B60K 13/02* | (2006.01) |

(52) U.S. Cl.
CPC .............. *F02B 33/40* (2013.01); *B60K 13/02* (2013.01); *F02B 33/44* (2013.01); *F02B 39/04* (2013.01); *B60K 2005/003* (2013.01)

(58) Field of Classification Search
CPC .... B60K 2005/003; F02B 33/44; F02B 33/40; F02B 39/04
See application file for complete search history.

(56) References Cited

U.S. PATENT DOCUMENTS

| | | | | |
|---|---|---|---|---|
| 9,518,504 | B2* | 12/2016 | Tanaka | F02B 29/0437 |
| 10,526,982 | B2* | 1/2020 | Fukuda | B60K 13/02 |
| 10,800,250 | B2* | 10/2020 | Nugteren | B60K 11/02 |
| 2009/0229582 | A1 | 9/2009 | Sakuyama | |
| 2018/0222311 | A1* | 8/2018 | Toupin | B60K 11/06 |

FOREIGN PATENT DOCUMENTS

WO   WO-2021192274 A1 *   9/2021

OTHER PUBLICATIONS

Perkins, Chris. "Why You Want Individual Throttle Bodies For Your Engine." Road & Track, Mar. 15, 2017, https://www.roadandtrack.com/new-cars/car-technology/videos/a32934/individual-throttle-body-benefits/#:~:text=With%20individual%20throttle%20bodies%20(ITBs,each%20cylinder%2C%20slowing%20response%20somewhat.*

* cited by examiner

*Primary Examiner* — Ngoc T Nguyen
(74) *Attorney, Agent, or Firm* — Wenderoth, Lind & Ponack, L.L.P.

(57) ABSTRACT

Provided is a utility vehicle including a seat, an engine disposed rearward of the seat, and a supercharger disposed between the seat and the engine.

13 Claims, 9 Drawing Sheets

Fig. 9

UTILITY VEHICLE

BACKGROUND OF THE INVENTION

Technical Field

The present disclosure relates to a utility vehicle.

Related Art

US 2009/0229582 A1 discloses a straddle type vehicle in which an engine is mounted below a seat. In this vehicle, a supercharger is attached to the rear of the engine.

SUMMARY

In a utility vehicle in which an engine is mounted rearward of a seat, when a supercharger is attached to the rear portion of the engine, the center of gravity of the utility vehicle tends to be located further rearward in the front-rear direction of the vehicle due to the supercharger which is a heavy object.

An object of the present disclosure is to provide a utility vehicle that has an engine mounted rearward of a seat and can suppress the center of gravity of the utility vehicle being located closer to the rear side of the vehicle when a supercharger is attached to the engine.

An aspect of the present disclosure provides
a utility vehicle including
a seat,
an engine disposed rearward of the seat, and
a supercharger disposed between the seat and the engine.

According to the present disclosure, since the supercharger is disposed between the seat and the engine, the center of gravity of the utility vehicle is located closer to the center in the front-rear direction than when the supercharger is disposed rearward of the engine.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

A vehicle 100 according to a first embodiment of the present disclosure will be described with reference to FIGS. 1 to 5. The vehicle 100 according to the present embodiment is a utility vehicle. In the following description, the front-rear direction, the left-right direction, and the up-down direction as viewed from a driver are respectively referred tows the front-rear direction, the left-right direction, and the up-down direction of the vehicle 100 and the components thereof.

First Embodiment

Figure 1:
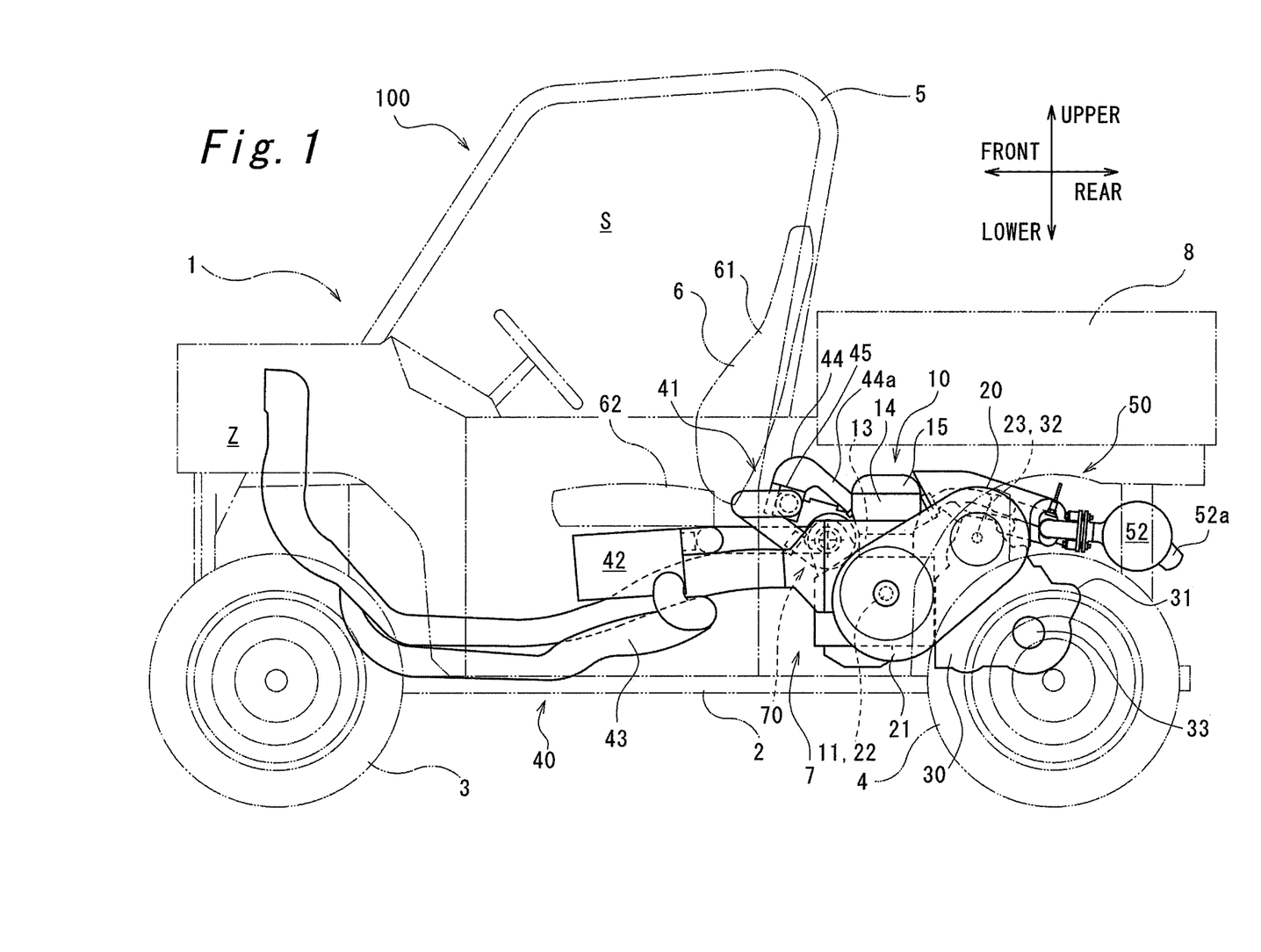
FIG. 1 is a left side view of a vehicle according to a first embodiment of the present disclosure.

FIG. 1 is a left side view of the vehicle 100. As illustrated in FIG. 1, the vehicle 100 includes a vehicle body 1, and a power train mechanism 7 mounted on the vehicle body 1. In FIG. 1, the vehicle body 1 is indicated by two-dot chain lines, and the power train mechanism 7 is indicated by solid lines.

The vehicle body 1 includes a vehicle body frame 2 constituting a framework. In the vehicle body 1, a pair of left and right front wheels 3 is disposed on both sides of the front portion of the vehicle body frame 2, and a pair of left and right rear wheels 4 is disposed on both sides of the rear portion of the vehicle body frame 2. A riding space S is located between the front wheels 3 and the rear wheels 4. The riding space S is surrounded by a rollover protective structure (ROPS) 5.

Figure 2:
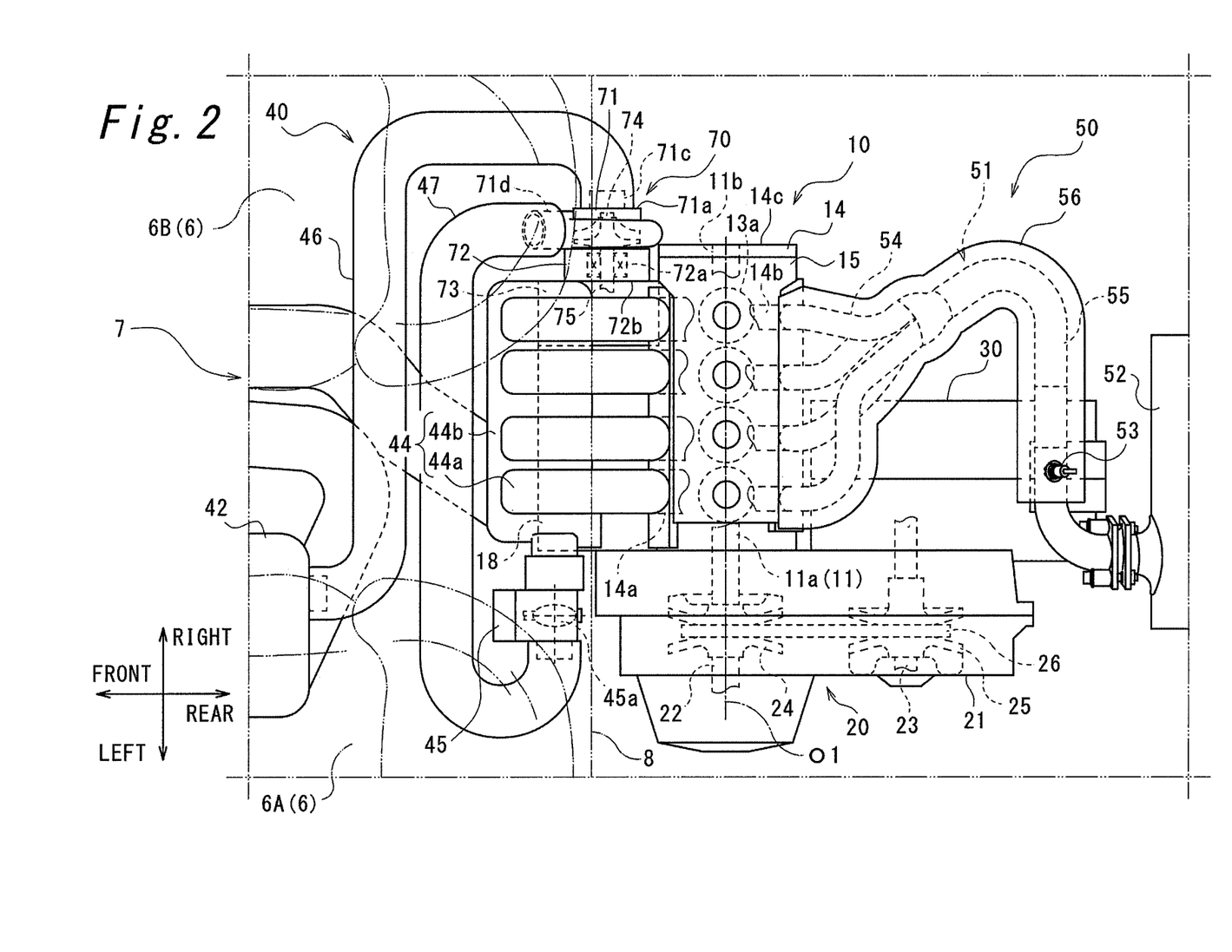
FIG. 2 is a plan view illustrating an engine and the periphery thereof in FIG. 1.

A seat 6 is disposed in the riding space S. FIG. 2 is a top view illustrating the power train mechanism 7 and the periphery thereof. In FIG. 2, the seat 6 and a cargo bed 8 to be described later are collectively indicated by two-dot chain lines. As illustrated in FIG. 2, the seat 6 includes a driver's seat 6A located on the left side in the riding space S and a passenger's seat 6B located on the right side in the riding space S. As illustrated in FIG. 1, the seat 6 includes a seat back 61 that supports the back of a passenger from behind, and a seat cushion 62 on which the passenger seats.

The cargo bed 8 is located rearward of the seat 6 of the vehicle body 1. The power train mechanism 7 is disposed below the cargo bed 8. The power train mechanism 7 includes an engine 10, a continuously variable transmission (CVT) 20 disposed on the left side of the engine 10, and a transmission 30 disposed rearward of the engine 10 and on the right side of the CVT 20. In the vehicle 100, the rotational torque output from the engine 10 is transmitted to the front wheels 3 and the rear wheels 4 with the rotational speed changed by the CVT 20 and the transmission 30.

The power train mechanism 7 will now be described. The power train mechanism 7 further includes an intake system 40, an exhaust system 50, and a supercharger 70 that supplies supercharged compressed air to the intake system 40.

As illustrated in FIG. 2, the engine 10 includes a crankshaft 11 that outputs rotational torque. In the present embodiment, the engine 10 is a 4-cycle straight-four engine in which an axial center O1 of the crankshaft 11 extends in the vehicle width direction and which has four cylinders 13a.

Figure 3:
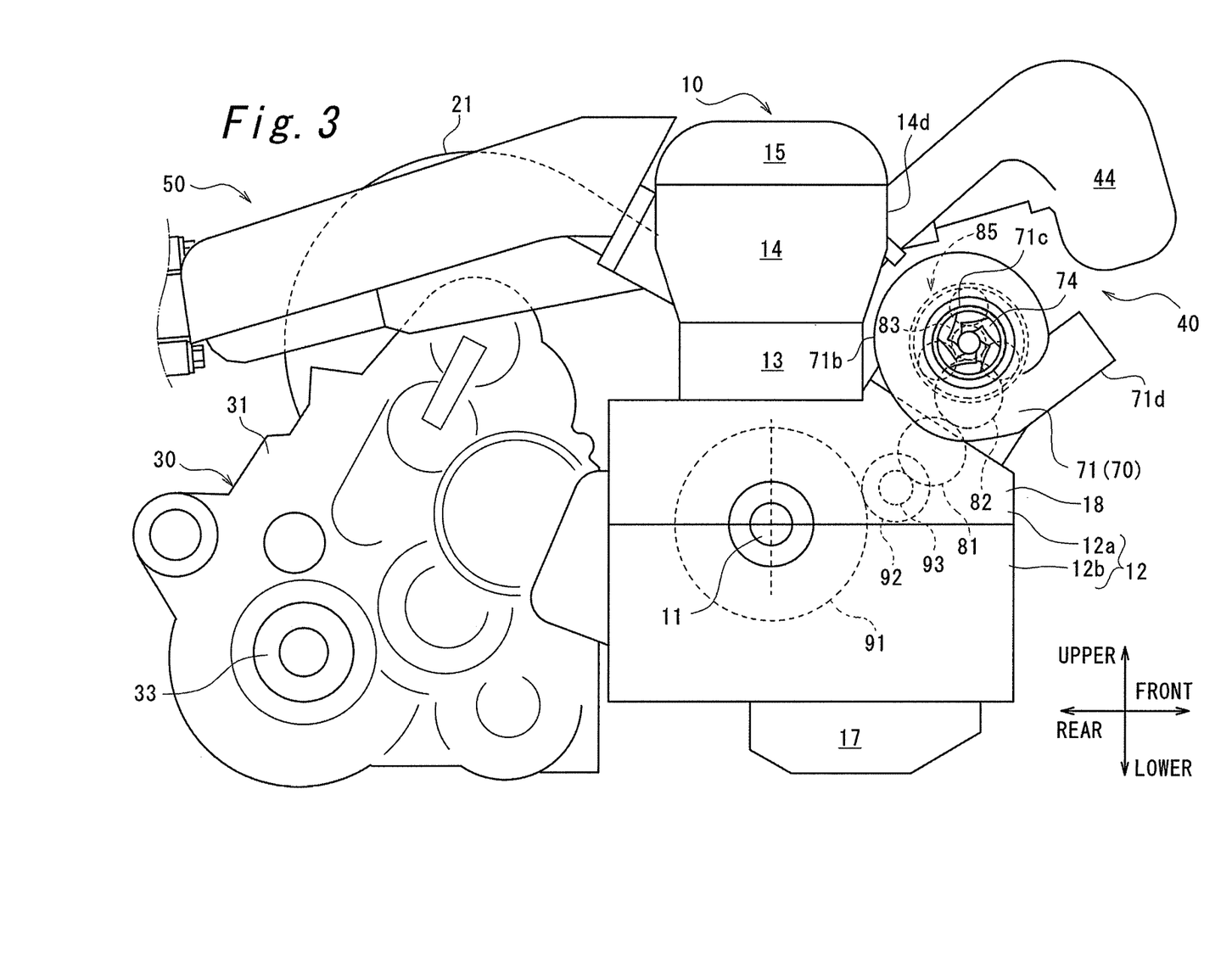
FIG. 3 is a right side view illustrating the engine and the periphery thereof.

FIG. 3 is a right side view illustrating the engine 10 and the periphery of the engine 10. As illustrated in FIG. 3, the engine 10 includes an oil pan 17, a crankcase 12, a cylinder 13, a cylinder head 14, and a cylinder head cover 15 in this order from the bottom.

The crankcase 12 is vertically divided into two parts, that is, an upper crankcase 12a on the upper side and a lower crankcase 12b on the lower side. The crankshaft 11 is rotatably supported between the upper crankcase 12a and the lower crankcase 12b. The crankcase 12 has a crankcase protrusion 18 protruding in the front side of the cylinder 13. The supercharger 70 is attached to the upper portion of the crankcase protrusion 18.

Figure 4:
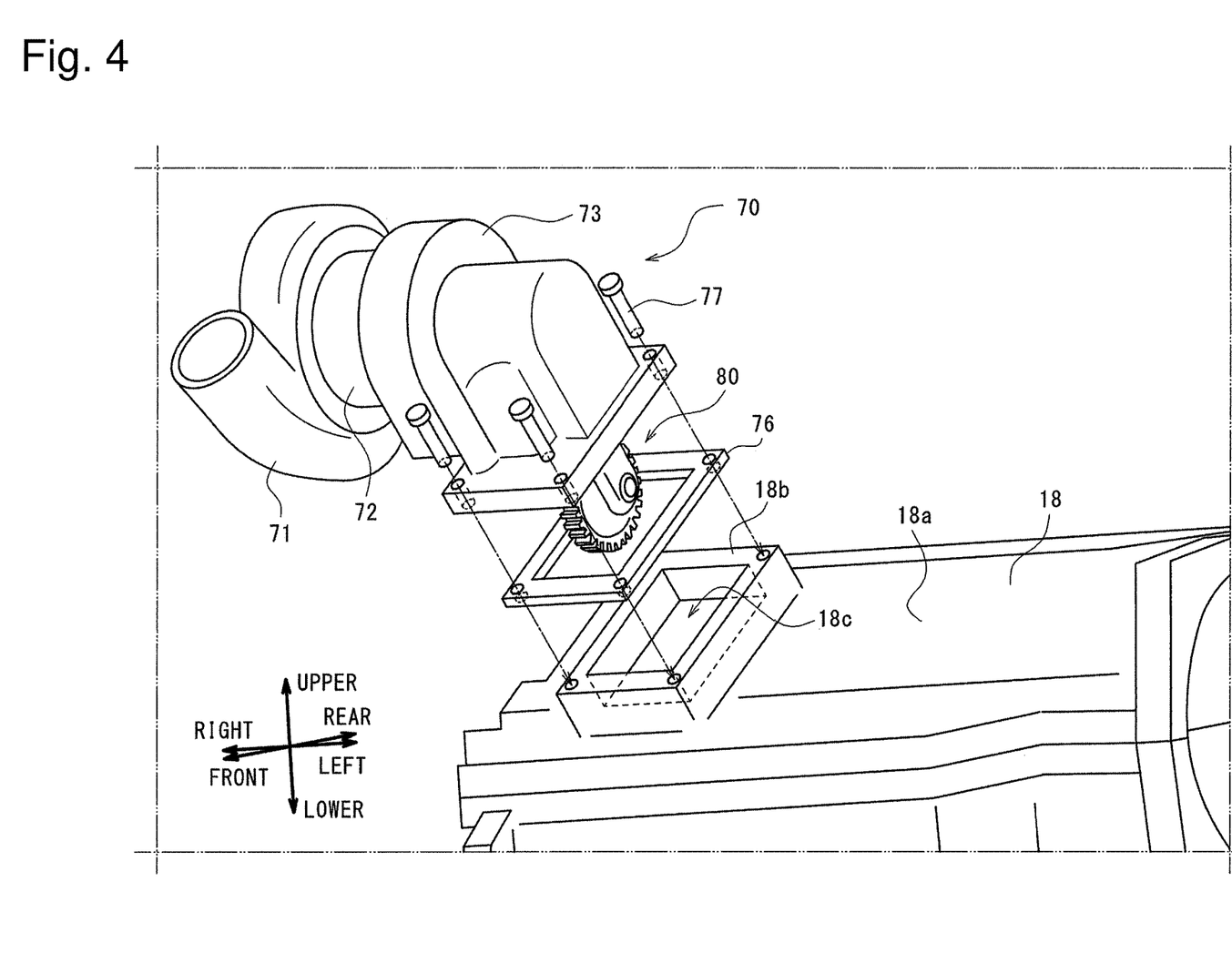
FIG. 4 is an exploded perspective view illustrating a supercharger detached from the engine.

FIG. 4 is an exploded perspective view illustrating the supercharger 70 detached from the crankcase protrusion 18. As illustrated in FIG. 4, an upper wall portion 18a of the crankcase protrusion 18 is inclined downward toward the front side. The upper wall portion 18a is formed on the right side thereof with a supercharger mounting base 18b protruding upward in a step manner and to which the supercharger 70 is mounted. The supercharger mounting base 18b is formed with an opening 18c penetrates the supercharger mounting base 18b along the up-down direction.

As illustrated in FIG. 3, the cylinder 13 is joined to the upper face of the crankcase 12. The cylinder head 14 is joined to the upper face of the cylinder 13. The cylinder head cover 15 is fixed to the upper face of the cylinder head 14. As illustrated in FIG. 2, the cylinder 13 includes four cylinders 13a extending in the up-down direction of the vehicle. The cylinder head 14 includes four intake ports 14a on the front side and four exhaust ports 14b on the rear side.

As illustrated in FIG. 2, the CVT 20 is disposed on the left side of and adjacent to the engine 10. The CVT 20 includes a CVT housing 21 constituting an outer shell, and a CVT input shaft 22, a CVT output shaft 23, a driving pulley 24, a driven pulley 25, and an endless belt 26 which are accommodated in the CVT housing 21.

The CVT input shaft 22 extends in the vehicle width direction and is coupled to the crankshaft 11 so as to be able to transmit power. The driving pulley 24 is disposed on the CVT input shaft 22 to rotate integrally with the CVT input shaft 22. The driven pulley 25 is disposed on the CVT output shaft 23 to rotate integrally with the CVT output shaft 23. The endless belt 26 is wounded around the driving pulley 24 and the driven pulley 25. In the CVT 20, the driving rotation input from the crankshaft 11 is transmitted to the CVT input shaft 22, then the rotational speed is changed via the driving pulley 24, the driven pulley 25, and the endless belt 26, and then the driving rotation is output from the CVT output shaft 23.

As illustrated in FIG. 1, the transmission 30 includes a transmission housing 31 forming an outer shell, and a transmission input shaft 32 and a transmission output shaft 33 which are accommodated in the transmission housing 31.

The transmission input shaft 32 extends in the vehicle width direction at the upper front portion of the transmission housing 31 and is coupled to the CVT output shaft 23 so as to be able to transmit power. The transmission output shaft 33 extends in the vehicle width direction at the rear lower portion of the transmission housing 31. In the transmission 30, the driving rotation input from the CVT output shaft 23 is transmitted to the transmission input shaft 32, then the rotational speed is changed, and then the driving rotation is output from the transmission output shaft 33.

As illustrated in FIG. 1, the intake system 40 is located on the front side of the engine 10. The intake system 40 includes an intake pipe 41, an air cleaner 42, and an intake duct 43. The intake pipe 41 includes an intake manifold 44 and a throttle body 45 in this order from the downstream side on an intake path.

As illustrated in FIG. 2, the intake manifold 44 includes four independent ports 44a each connected, at the downstream side, to the corresponding one of the intake ports 14a of the cylinder head 14, and an inlet port 44b in which the independent ports 44a are integrated, at the upstream side, into a single port. As illustrated in FIG. 1, the independent ports 44a extend in a direction inclined downward toward the rear side. Referring back to FIG. 2, the inlet port 44b extends across the upstream ends of the independent ports 44a, that is, in the left-right direction at the front ends of the independent ports 44a in the drawing. The inlet port 44b has an inlet at the left end thereof.

The throttle body 45 is connected to the left side of the intake manifold 44. Specifically, the throttle body 45 is connected to the left end of the inlet port 44b of the intake manifold 44. In the present embodiment, the throttle body 45 includes a single electronically controlled throttle valve 45a, and adjusts the amount of air flowing into the engine 10 at the inlet of the intake manifold 44 to control the rotational speed of the engine 10.

The air cleaner 42 is disposed below the seat 6 and in front of the engine 10 with a space therebetween. Specifically, the air cleaner 42 is disposed below the seat cushion 62 of the driver's seat 6A.

As illustrated in FIG. 1, the intake duct 43 has a downstream end connected to the lower rear end of the left side face of the air cleaner 42. The intake duct 43 extends forward to reach a bonnet space Z.

As illustrated in FIG. 2, the intake system 40 further includes a compressor inlet pipe 46 and a compressor outlet pipe 47. The compressor inlet pipe 46 connects the air cleaner 42 to a compressor inlet 71c, described later, of the supercharger 70. The compressor outlet pipe 47 connects a compressor outlet 71d, described later, of the supercharger 70 to the throttle body 45.

In the intake system 40, the intake air taken in through the intake duct 43 is filtered by the air cleaner 42 and then sent to the supercharger 70 through the compressor inlet pipe 46. The intake air is supercharged in the supercharger 70, discharged as compressed air, and sent to the throttle body 45 through the compressor outlet pipe 47. In the throttle body 45, the intake air is adjusted to the flow rate corresponding to the output power required of the engine 10, and then sent to the intake manifold 44. In the intake manifold 44, the intake air is distributed from the inlet port 44b to the independent ports 44a, and then introduced into the intake ports 14a.

As illustrated in FIG. 2, the exhaust system 50 is located on the rear side of the engine 10. The exhaust system 50 includes an exhaust pipe 51, an exhaust muffler 52, and an exhaust gas sensor 53. The exhaust system 50 further includes a heat cover 56 that covers substantially the entire periphery of the exhaust pipe 51 from above. The exhaust pipe 51 extends rearward from the rear portion of the cylinder head 14, and includes four independent exhaust pipes 54 connected to the respective exhaust ports 14b, and a collecting pipe 55 connected to the downstream ends of the independent exhaust pipes 54 to gather the independent exhaust pipes 54. The downstream end of the collecting pipe 55 is connected to the exhaust muffler 52. As illustrated in FIG. 1, the exhaust muffler 52 includes a tail pipe 52a through which exhaust gas is discharged.

In the exhaust system 50, the exhaust gas discharged from the exhaust ports 14b of the cylinder head 14 is discharged into the four independent exhaust pipes 54 and gathered in the collecting pipe 55, then introduced into the exhaust muffler 52, purified and silenced in the exhaust muffler 52, and finally discharged to the atmosphere from the tail pipe 52a.

As illustrated in FIG. 2, the supercharger 70 is disposed between the seat 6 and the engine 10 in the front-rear direction. Specifically, the supercharger 70 is located further on the front side than the axial center O1 of the crankshaft 11. More specifically, the supercharger 70 is disposed on the front side of the engine 10 and at the side opposite from the side where the CVT 20 is disposed, that is, at the right side of the engine 10. In other words, the supercharger 70 is close to a second end 11b of the crankshaft 11, the second end being one of axial ends in the direction along the axial center of the crankshaft 11 and not a first end 11a coupled to the CVT 20.

As illustrated in FIG. 4, the supercharger 70 is attached to the supercharger mounting base 18b in a direction inclined from the upper front side to the lower rear side. The supercharger 70 includes a compressor housing 71, a bearing housing 72, and a gear housing 73 in this order from the right side.

As illustrated in FIG. 2, the compressor housing 71 includes the compressor inlet 71c at the right end, and the compressor outlet 71d protruding upward from the outer circumferential portion. The compressor inlet pipe 46 is connected to the compressor inlet 71c. The compressor outlet pipe 47 is connected to the compressor outlet 71d. An impeller 74 is accommodated in the compressor housing 71. The supercharger 70 is a centrifugal compressor that compresses the air introduced from the compressor inlet 71c with the rotationally driven impeller 74 and discharges the air as compressed air from the compressor outlet 71d. The impeller 74 integrally has a rotation shaft 75 extending leftward and penetrating the bearing housing 72 to reach the gear housing 73.

The compressor housing 71 is located further on the right side than the cylinder head 14. Specifically, a right end 71a of the compressor housing 71 is located further on the right side than a right end 14c of the cylinder head 14. As illustrated in FIG. 3, a rear end 71b of the compressor housing 71 is located further rearward of a front end 14d of the cylinder head. The right end 71a is a portion in the rightmost of the compressor housing 71 except for the compressor inlet 71c and the compressor outlet 71d. The rear end 71b is a portion in the rearmost of the compressor housing 71 except for the compressor inlet 71c and the compressor outlet 71d.

As illustrated in FIG. 2, the bearing housing 72 is fixed to the compressor housing 71 from the left side, and includes a bearing 72a that rotatably supports the rotation shaft 75. A left end 72b of the bearing housing 72 is further on the left side than the right end 14c of the cylinder head. That is, at least a portion of the cylinder head 14 is included in a region where the bearing housing 72 is projected to the rear side of the vehicle. In other words, the bearing housing 72 is located further in the inner side in the vehicle width direction than the compressor housing 71 and the outer end, in the vehicle width direction, of the cylinder head 14.

The gear housing 73 is fixed to the bearing housing 72 from the left side. As illustrated in FIG. 4, the supercharger 70 is detachably attached to the supercharger mounting base 18b by a plurality of fastening bolts 77 at the lower end of the gear housing 73 with a gasket 76 interposed therebetween. When the supercharger 70 is not attached to the engine 10, a lid member is attached to the supercharger mounting base 18b instead of the supercharger 70 to shut the inside of the crankcase 12 from the outside. Thus, the crankcase 12 can be commonly used regardless of using or not using a supercharger.

The gear housing 73 accommodates a supercharger drive mechanism 80 that mechanically and rotationally drives the rotation shaft 75 (see FIG. 2) of the impeller 74 by use of the rotation of the crankshaft 11. The supercharger drive mechanism 80 extends to the inside of the crankcase 12 through the opening 18c, and is coupled to an auxiliary unit drive mechanism 90 (see FIG. 5) disposed inside the crankcase 12 so as to be capable of transmitting power.

Figure 5:
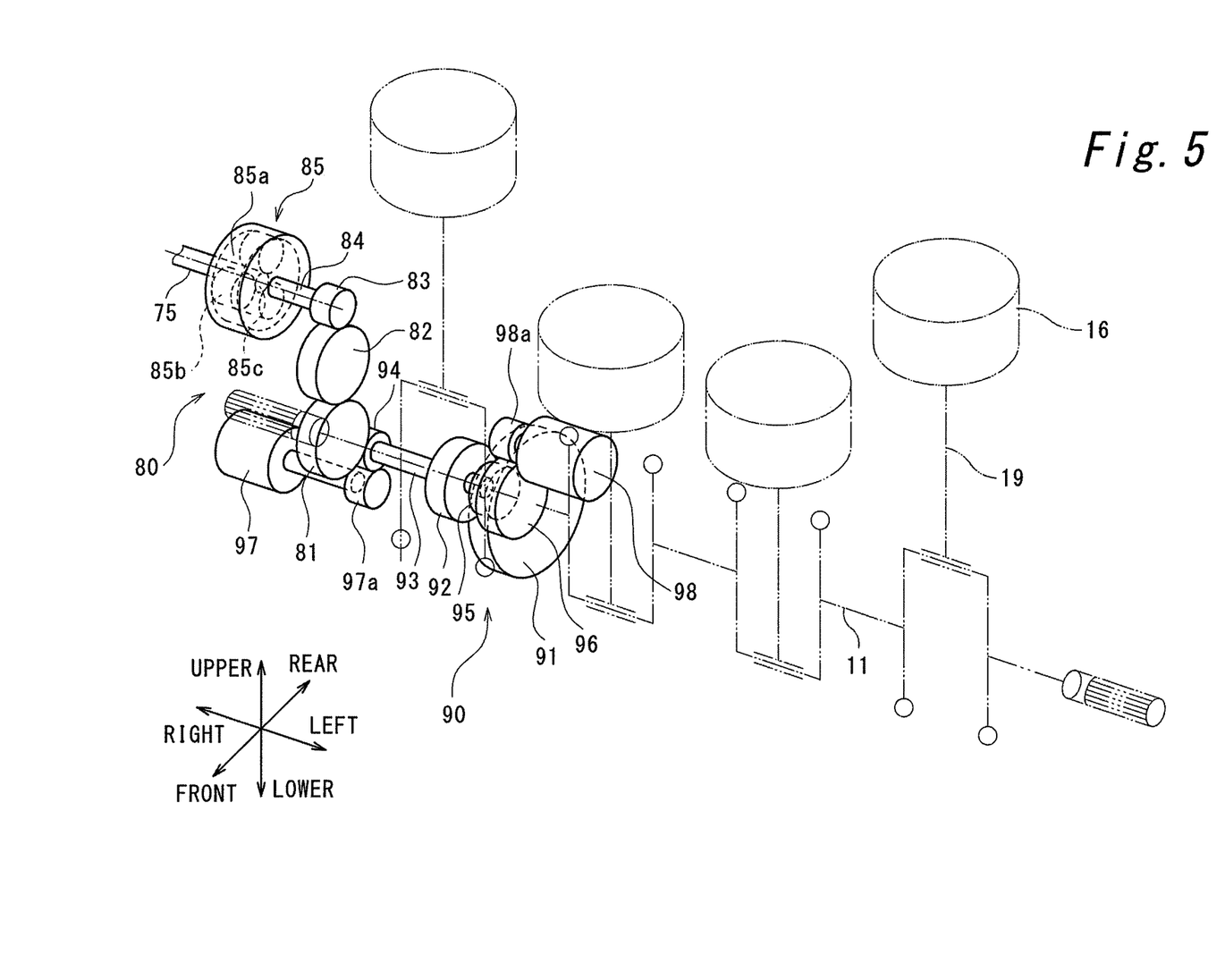
FIG. 5 is a perspective view schematically illustrating a driving force transmission mechanism.

FIG. 5 is a perspective view schematically illustrating the supercharger drive mechanism 80 and the auxiliary unit drive mechanism 90. In FIG. 5, the crankshaft 11, pistons 16, and connecting rods 19 are indicated by two-dot chain lines. As illustrated in FIG. 5, the auxiliary unit drive mechanism 90 includes a drive gear 91 integrally formed on the crankshaft 11, an auxiliary unit driving gear 92 meshing with the drive gear 91 from the front upper side, an oil pump driving gear 94 that rotates integrally with the auxiliary unit driving gear 92 via a drive shaft 93 extending from the auxiliary unit driving gear 92 to the right side, and a starter driven gear 96 provided on the left side of the auxiliary unit driving gear 92 with a one-way clutch 95 interposed therebetween.

An oil pump gear 97a of an oil pump 97 meshes with the oil pump driving gear 94 from below. The oil pump driving gear 94 rotationally drives the oil pump 97 via the oil pump gear 97a.

The starter driven gear 96 meshes with a starter gear 98a of a starter 98 from above. The one-way clutch 95 transmits the rotation from the starter 98 to the auxiliary unit driving gear 92, but does not transmit the rotation from the auxiliary unit driving gear 92 to the starter 98. That is, when starting the engine 10, the starter driven gear 96 is rotationally driven by the starter gear 98a to rotationally drive the crankshaft 11 via the one-way clutch 95, the auxiliary unit driving gear 92, and the drive gear 91. After the engine 10 has started, the rotation from the crankshaft 11 is cut off by the one-way clutch 95 and is not transmitted to the starter 98. The oil pump 97 and the starter 98 are examples of an engine auxiliary unit according to the present disclosure.

The supercharger drive mechanism 80 includes, as driving force transmission members, a supercharger driving first gear 81 meshing with the oil pump driving gear 94 from the front upper side, a supercharger driving second gear 82 meshing with the supercharger driving first gear 81 from the upper side, a supercharger driving third gear 83 meshing with the supercharger driving second gear 82 from the upper side, and a planetary gear mechanism 85 coupled to the supercharger driving third gear 83 via a drive shaft 84. The planetary gear mechanism 85 includes a bottomed cylindrical outer gear 85a opened to the right side, three planetary gears 85b meshing with the inner wall of the outer gear 85a, and a sun gear 85c located at the center of the three planetary gears 85b and meshing with the planetary gears 85b. The sun gear 85c is integrally formed on the left end of the rotation shaft 75 of the impeller 74. In the present embodiment, the rotation of the crankshaft 11 is accelerated by eight times and transmitted to the impeller 74 via the auxiliary unit drive mechanism 90 and the supercharger drive mechanism 80. That is, the impeller 74 is rotationally driven at a rotational speed higher than the rotational speed of the crankshaft 11, and compresses the air suctioned from the compressor inlet 71c to raise the intake air pressure, and the compressed air is discharged from the compressor outlet 71d. The compressed air is supplied to the engine 10 via the compressor outlet pipe 47, the throttle body 45, and the intake manifold 44. The compressed air raises the charging efficiency of the air into the engine 10, whereby the output power of the engine 10 is increased as compared with an engine without a supercharger.

The vehicle 100 according to the embodiment described above has the following effects.

(1) Since the supercharger 70 is disposed between the seat 6 and the engine 10 disposed rearward of the seat 6 in the front-rear direction, the center of gravity of the vehicle 100 is located closer to the center in the front-rear direction than when a supercharger is disposed rearward of an engine. This readily improves the handling stability of the vehicle 100.

(2) Since the engine 10 includes the centrifugal supercharger 70 rotationally driven by the supercharger drive mechanism 80, the supercharging pressure can be readily increased while suppressing an increase in the size of the supercharger as compared with when adopting a displacement type supercharger. Moreover, unlike when adopting an exhaust turbocharger, there is no turbo lag at a low engine rotational speed, and the supercharging pressure can be readily raised with good response to the engine rotational speed.

(3) Since the supercharger 70 is attached to the supercharger mounting base 18b of the crankcase protrusion 18 from the upper front side, the supercharger 70 can be readily disposed close to the engine 10 and the engine 10 can be readily made small in size in the front-rear direction. Furthermore, since the supercharger drive mechanism 80 includes the supercharger driving first gear 81, the supercharger driving second gear 82, the supercharger driving third gear 83, and the planetary gear mechanism 85 as the driving force transmission members, the speed increase ratio can be readily raised as compared with when transmitting the drive force via a belt. As a result, the rotational speed of the supercharger can be readily increased to be further higher than the engine rotational speed, and the supercharging pressure can be further readily increased.

(4) Since the supercharger 70, the engine 10, and the exhaust system 50 are disposed in this order from the front side, the supercharger 70 can be readily protected from an affect by heat radiated by the exhaust system 50. This readily suppresses the rise in the temperature of the compressed air discharged from the supercharger 70, and the charging efficiency of the intake air into the engine 10 can be readily raised.

(5) Since the intake system 40 and the supercharger 70 are located further on the front side than the rotational axial center O1 of the crankshaft 11, the compressor inlet pipe 46 connecting the supercharger 70 to the intake system 40 and the compressor outlet pipe 47 can be readily made short. As a result, a short intake path readily achieves a good response of the supercharging pressure to the change in the engine rotational speed.

(6) In the present embodiment, since the engine 10 is a multi-cylinder engine and the crankshaft 11 extends in the vehicle width direction, the dimension of the engine 10 in the vehicle width direction is large, which may result in small spaces on both sides, in the vehicle width direction, of the engine 10 and thus restrict the arrangement of other components in the spaces. However, since the intake system 40 and the supercharger 70 are disposed on the front side of the rotational axial center O1 of the crankshaft 11 and the exhaust system 50 is disposed on the rear side of the rotational axial center O1 of the crankshaft 11, there is no need to arrange the pipes of the intake system 40 and the exhaust system 50 so as to pass across the engine 10 in the front-rear direction through the spaces. Thus, even a multi-cylinder engine can be readily mounted in a limited mounting space by arranging the pipes in a compact manner.

(7) Since the rear end 71b of the compressor housing 71 is located further on the rear side than the front end 14d of the cylinder head 14, the supercharger 70 can be mounted with the suppressed amount of the supercharger 70 protruding forward with respect to the cylinder head 14.

(8) The right end 71a of the compressor housing 71 is located further on the right side than the right end 14c of the cylinder head 14, and the left end 72b of the bearing housing 72 is located further on the left side than the right end 14c of the cylinder head 14. As a result, the supercharger 70 can be readily mounted with the suppressed amount of the supercharger 70 protruding outward in the vehicle width direction with respect to the cylinder head 14.

(9) The CVT 20 is disposed at the first end 11a on the left side of the crankshaft 11 in the direction along the axial center of the crankshaft 11, and the supercharger 70 is disposed close to the second end 11b on the right side of the crankshaft 11. As a result, the supercharger 70 and the CVT 20 are disposed at different sides with respect to the engine 10 in the direction along the axial center of the crankshaft 11. This enables the supercharger 70 and the CVT 20 to be disposed in a compact manner without interfering with each other. In the present disclosure, described as an example is the case where the CVT 20 is disposed on the left side of the engine 10. However, the effect described above is similarly exhibited for a case where a transmission is disposed instead of the CVT 20.

(10) The intake system 40 includes the intake manifold 44 having the inlet port 44b to which the compressed air discharged from the supercharger 70 is supplied and the plurality of independent ports 44a, and the single throttle valve 45a disposed on the intake path on the upstream side of the inlet port 33b. This configuration in which the amount of suctioned air is controlled via the single throttle valve 45a can reduce the number of parts and cost as compared with a case where a throttle valve is provided to each of the plurality of cylinders 13a.

(11) Driving force can be transmitted to the supercharger drive mechanism 80 by use of the auxiliary unit drive mechanism 90 that transmits driving force from the crankshaft 11 to the oil pump 97 and the starter 98. For a case where the supercharger 70 is not mounted on an engine, the engine and the auxiliary unit drive mechanism 90 can be commonly used, so that variations of parts can be readily reduced.

(12) Since the supercharger drive mechanism 80 includes the planetary gear mechanism 85, the speed increase ratio can be readily increased. This further readily increases the rotational speed of the supercharger 70 with respect to the engine rotational speed, and thereby the supercharging pressure can be further readily increased.

Second Embodiment

Figure 6:
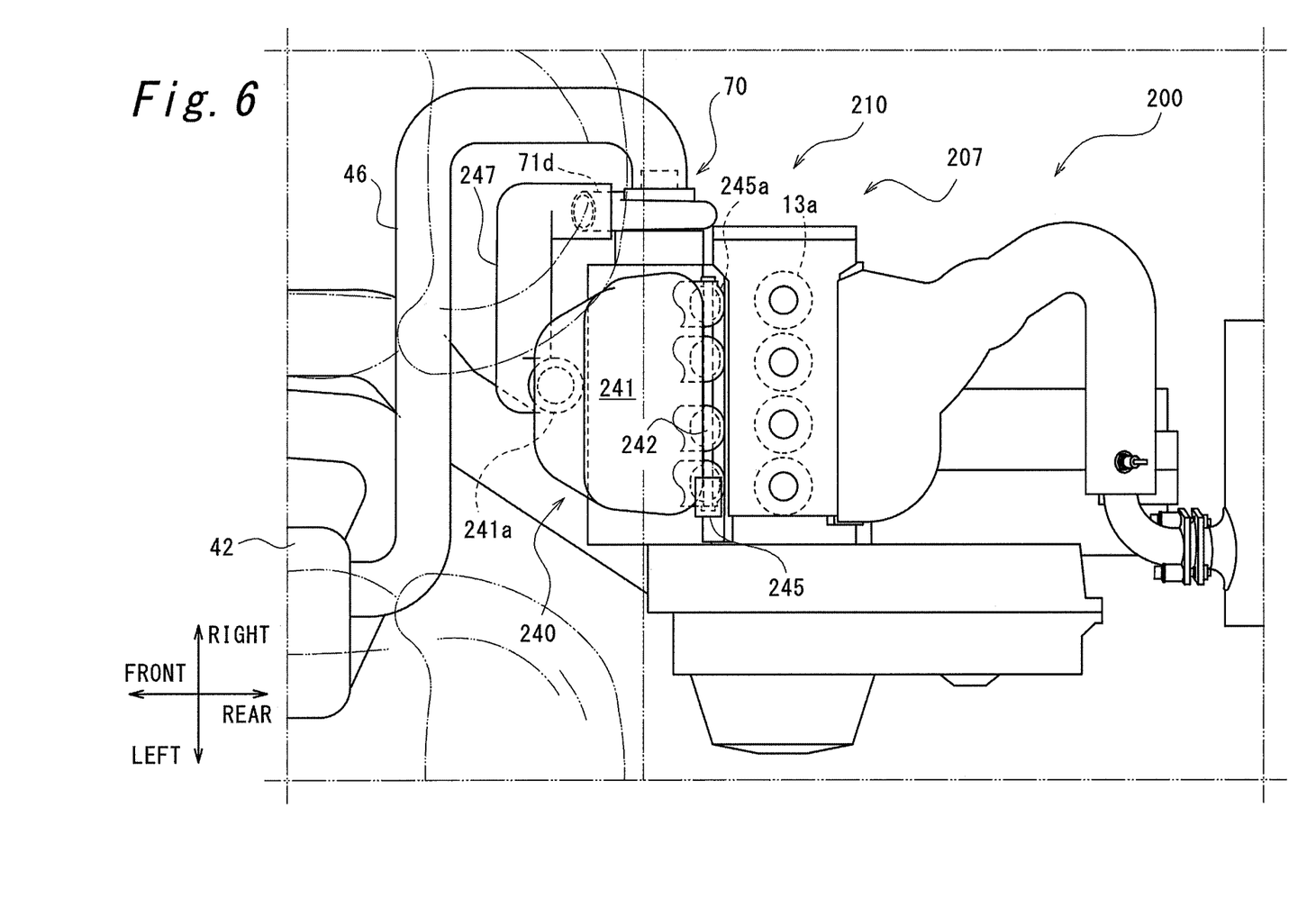
FIG. 6 is a plan view illustrating an engine and the periphery thereof according to a second embodiment.

A power train mechanism 207 mounted on a vehicle 200 according to a second embodiment will be described with reference to FIG. 6. In the following description, members common to those of the first embodiment are denoted by the same reference numerals, and description thereof is omitted. FIG. 6 is a plan view illustrating an engine 210 and the periphery thereof of the power train mechanism 207. As illustrated in FIG. 6, the engine 210 is different from the engine 10 according to the first embodiment in the configurations of an intake manifold 240, a throttle body 245, and a compressor outlet pipe 247.

The intake manifold 240 includes a chamber 241, and four independent ports 242 branching from the outlet of the chamber 241 and connected to respective intake ports 14a of a cylinder head 14. The chamber 241 has a chamber inlet 241a to which the compressor outlet pipe 247 is connected. The chamber inlet 241a protrudes downward at the lower portion of the front end of the intake manifold 240. The compressor outlet pipe 247 connects a compressor outlet 71d to the chamber inlet 241a. The throttle body 245 is provided adjacent to the four independent ports 242. The throttle body 245 includes four throttle valves 245a that open and close the respective four independent ports 242 by use of electronic control.

According to the present embodiment, since each of the plurality of throttle valves 245a is provided for the corresponding one of a plurality of cylinders 13a, the amount of intake air introduced into each cylinder 13a can be readily adjusted optimally. This readily improves the performance of the engine 210.

Third Embodiment

Figure 7:
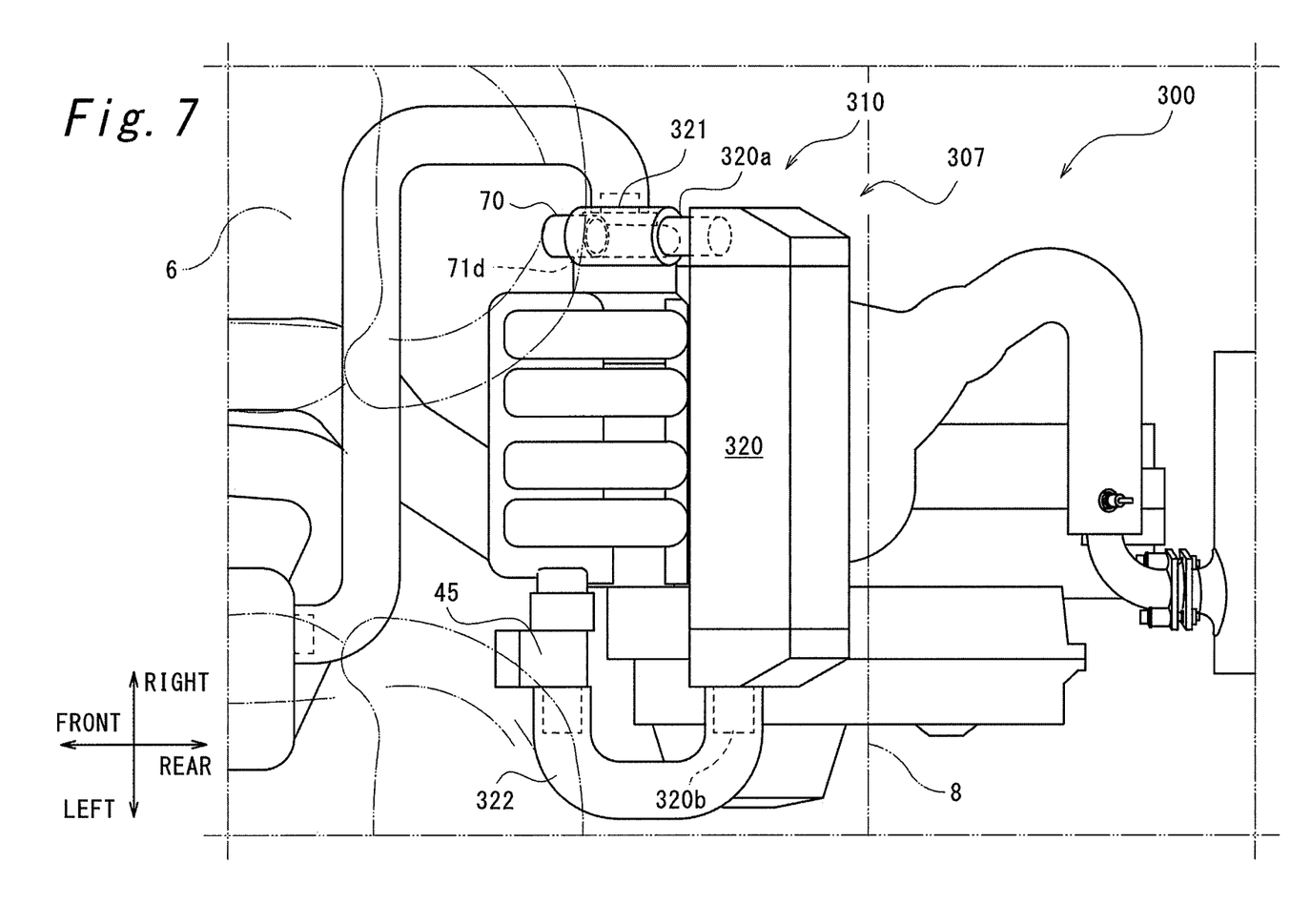
FIG. 7 is a plan view illustrating an engine and the periphery thereof according to a third embodiment.

A power train mechanism 307 mounted on a vehicle 300 according to a third embodiment will be described with reference to FIG. 7. In the following description, members common to those of the first embodiment are denoted by the same reference numerals, and description thereof is omitted. FIG. 7 is a plan view illustrating an engine 310 and the periphery thereof of the power train mechanism 307. As illustrated in FIG. 7, the power train mechanism 307 is different from the power train mechanism 7 according to the first embodiment in that the power train mechanism 307 includes an intercooler 320 as a heat exchanger, and an intercooler inlet pipe 321 and an intercooler outlet pipe 322 instead of the compressor outlet pipe 47.

The intercooler 320 is disposed above the engine and between a seat 6 and a cargo bed 8. In the present embodiment, the intercooler 320 is of air-cooling type that cools, by exchanging heat with a traveling wind, the compressed air of which temperature has risen by compression in a supercharger 70. The intercooler 320 has an intercooler inlet 320a protruding downward at the left end and an intercooler outlet 320b protruding rightward at the right end. The intercooler inlet pipe 321 connects a compressor outlet 71d to the intercooler inlet 320a. The intercooler outlet pipe 322 connects the intercooler outlet 320b to a throttle body 45.

According to the present embodiment, the compressed air of which temperature has risen by compression in the supercharger 70 is cooled by the intercooler 320, whereby the charging efficiency of the air into the engine 310 can be raised.

Fourth Embodiment

Figure 8:
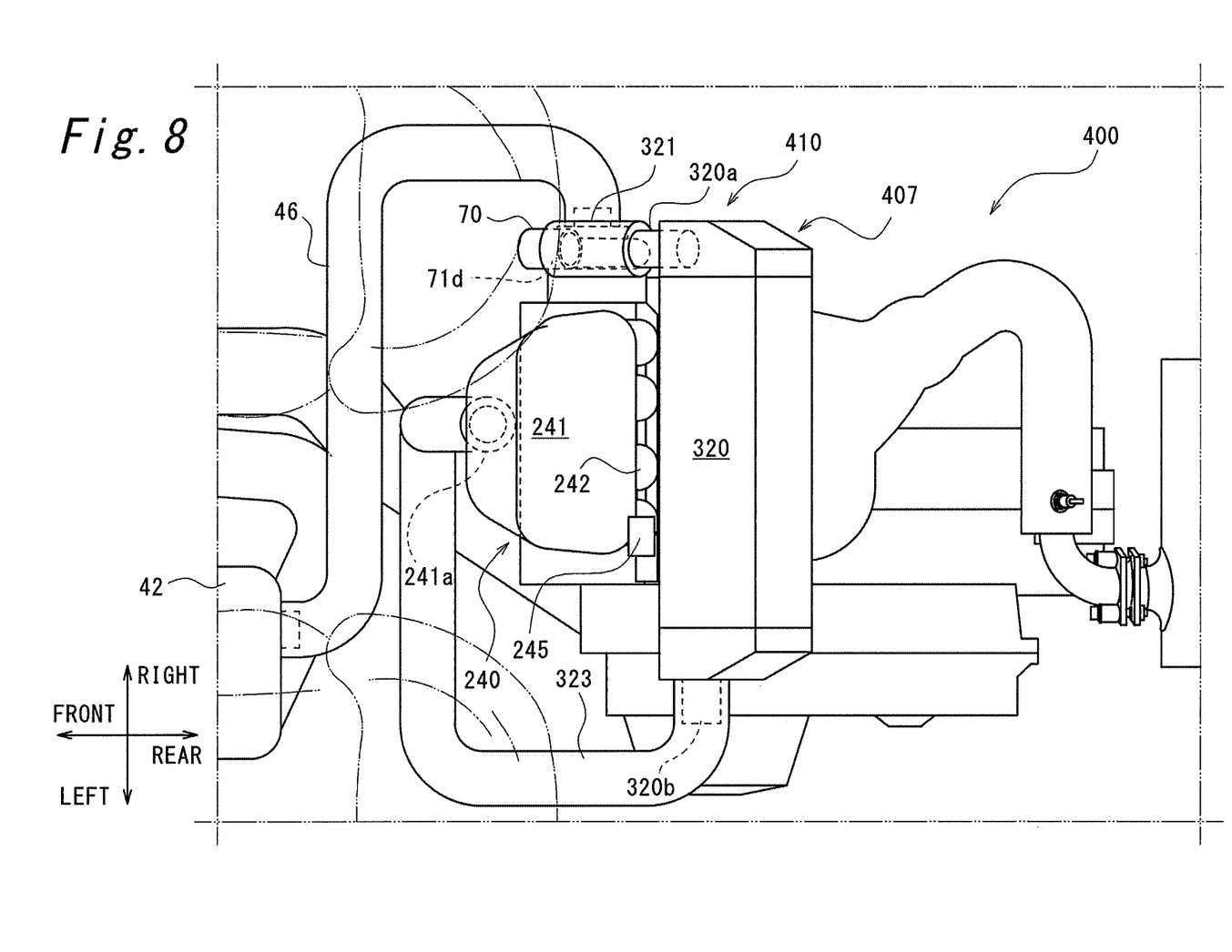
FIG. 8 is a plan view illustrating an engine and the periphery thereof according to a fourth embodiment.

A power train mechanism 407 mounted on a vehicle 400 according to a fourth embodiment will be described with reference to FIG. 8. In the following description, members common to those of the first to third embodiments are denoted by the same reference numerals, and description thereof is omitted. FIG. 8 is a plan view illustrating an engine 410 and the periphery thereof of the power train mechanism 407. As illustrated in FIG. 8, the power train mechanism 407 is different from the power train mechanism 207 according to the second embodiment in that the power train mechanism 407 includes the intercooler 320 described in the third embodiment, and an intercooler inlet pipe 321 and an intercooler outlet pipe 323 instead of the compressor outlet pipe 247. The intercooler outlet pipe 323 connects an intercooler outlet 320b to a chamber inlet 241a.

According to the present embodiment, the compressed air of which temperature has risen by compression in a supercharger 70 is cooled by the intercooler 320, whereby the charging efficiency of the air into the engine 410 can be raised.

The present disclosure is not limited to the configuration described in the embodiments described above, and various modifications can be made.

Figure 9:
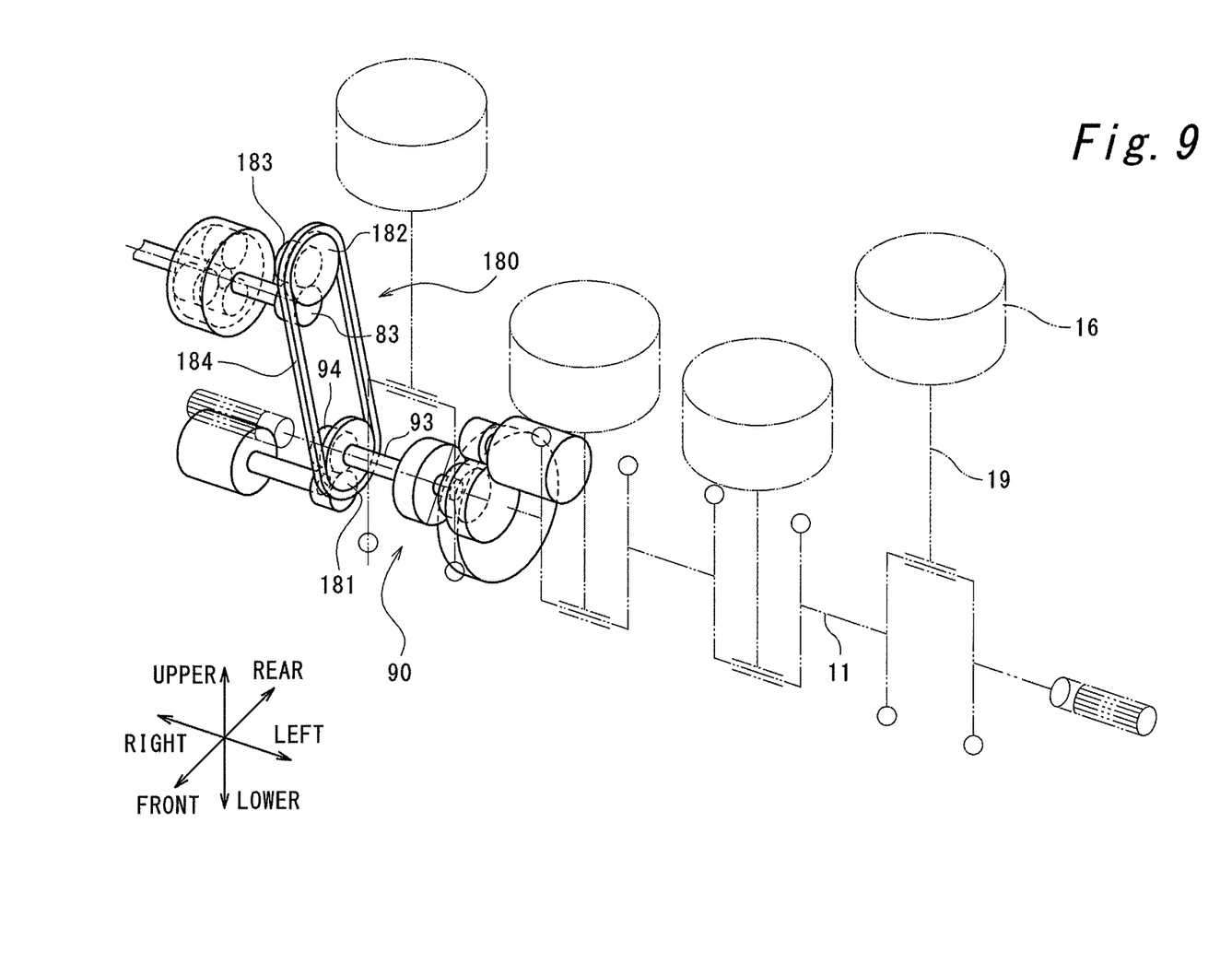
FIG. 9 is a perspective view schematically illustrating a driving force transmission mechanism according to an exemplary modification.

In the embodiments described above, the supercharger drive mechanism 80 includes a plurality of gears, but the present invention is not limited thereto. FIG. 9 illustrates a supercharger drive mechanism 180 according to an exemplary modification. As illustrated in FIG. 9, the supercharger drive mechanism 180 is different from the supercharger drive mechanism 80 in that the supercharger drive mechanism 180 includes a supercharger driving first sprocket 181, a supercharger driving second sprocket 182, a supercharger driving gear 183, and a chain 184 instead of the supercharger driving first gear 81 and the supercharger driving second gear 82.

The supercharger driving first sprocket 181 is disposed on a drive shaft 93 to rotate integrally with the drive shaft 93. The supercharger driving second sprocket 182 is disposed above a supercharger driving third gear 83. The supercharger driving gear 183 is coaxially provided on the supercharger driving second sprocket 182 to rotate integrally with the supercharger driving second sprocket 182, and meshes with the supercharger driving third gear 83 from above. The chain 184 is wounded around the supercharger driving first sprocket 181 and the supercharger driving second sprocket 182.

In the supercharger drive mechanism 180, the rotation of a drive shaft 84 is transmitted to the supercharger driving third gear 83 via the supercharger driving first sprocket 181, the supercharger driving second sprocket 182, the supercharger driving gear 183, and the chain 184. Thus, the rotation of a crankshaft 11 is transmitted to a rotation shaft 75 of the impeller 74 via the supercharger drive mechanism 180.

What is claimed is:

1. A utility vehicle comprising:
   a seat;
   an engine disposed rearward of the seat;
   a supercharger disposed between the seat and the engine; and
   an exhaust system connected to a rear portion of the engine,
   wherein the supercharger, the engine, and the exhaust system are disposed in this order from a front side of the vehicle.

2. A utility vehicle comprising:
   a seat;
   an engine disposed rearward of the seat;
   a supercharger disposed between the seat and the engine; and
   an intake system connected to a front portion of the engine, wherein
   the engine includes a crankshaft extending in a vehicle width direction, and
   the supercharger is located further on a front side of the vehicle than an axial center of the crankshaft.

3. The utility vehicle according to claim 2, wherein the engine includes a plurality of cylinders.

4. The utility vehicle according to claim 2, further comprising:
   an exhaust system connected to a rear portion of the engine, wherein
   the engine includes four cylinders.

5. The utility vehicle according to claim 2, wherein the engine includes a cylinder head, and
   the supercharger includes
   an impeller, and a compressor housing accommodating the impeller, a rear end of the compressor housing being located further on a rear side than a front end of the cylinder head.

6. The utility vehicle according to claim 2, wherein the engine includes a cylinder head, and
the supercharger includes
an impeller having a rotation shaft,
a compressor housing accommodating the impeller and located further on an outer side in the vehicle width direction than the cylinder head, and
a bearing housing rotatably supporting the rotation shaft of the impeller, and located further on an inner side in the vehicle width direction than the compressor housing and an outer end, regarding the vehicle width direction, of the cylinder head.

7. The utility vehicle according to claim 2, wherein the engine includes a plurality of cylinders, and
the intake system includes
an inlet through which compressed air discharged from the supercharger is supplied,
a chamber including a plurality of outlets each connected to a corresponding one of the plurality of cylinders, and
a plurality of throttle valves each disposed at a corresponding one of the plurality of outlets.

8. The utility vehicle according to claim 2, wherein the engine includes a plurality of cylinders, and
the intake system includes
an inlet port through which compressed air discharged from the supercharger is supplied,
an intake manifold including a plurality of independent ports each branching to be connected to a corresponding one of the plurality of cylinders, and
a single throttle valve disposed on an upstream side on an intake path to the inlet port.

9. The utility vehicle according to claim 2, wherein the engine further includes
an engine auxiliary unit,
an auxiliary unit drive mechanism to which a power is transmitted from the crankshaft via a gear, a driving force being transmitted between the auxiliary unit drive mechanism and the engine auxiliary unit, and
a supercharger drive mechanism including a driving force transmission member that is a gear, and configured to transmit a rotation of the crankshaft to the supercharger while increasing a rotational speed of the crankshaft via the driving force transmission member to rotationally drive the supercharger, and
the driving force is transmitted from the crankshaft to the supercharger drive mechanism via the auxiliary unit drive mechanism.

10. The utility vehicle according to claim 2, wherein the engine further includes
a supercharger drive mechanism including a driving force transmission member that is a gear, and configured to transmit a rotation of the crankshaft to the supercharger while increasing a rotational speed of the crankshaft via the driving force transmission member to rotationally drive the supercharger, and
the supercharger drive mechanism includes a planetary gear mechanism.

11. The utility vehicle according to claim 2, further comprising
a heat exchanger configured to cool compressed air discharged from the supercharger.

12. The utility vehicle according to claim 2, wherein the engine includes
a crankcase rotatably supporting the crankshaft, and
a supercharger drive mechanism including a driving force transmission member that is a gear, and configured to transmit a rotation of the crankshaft to the supercharger while increasing a rotational speed of the crankshaft via the driving force transmission member to rotationally drive the supercharger, and
the supercharger includes a centrifugal compressor, is supported at an upper portion of the crankcase, and is rotationally driven by the crankshaft via the driving force transmission member to discharge compressed air to the intake system.

13. A utility vehicle comprising:
a seat;
an engine disposed rearward of the seat;
a supercharger disposed between the seat and the engine; and
a transmission, wherein
the engine includes a crankshaft extending in a vehicle width direction,
the transmission is connected to a first end of the crankshaft so as to be able to transmit power, and
the supercharger is close to a second end of the crankshaft in a direction along an axial center of the crankshaft, the second end being one of axial ends of the crankshaft and not the first end.

* * * * *